June 6, 1967 J. R. HARDY 3,323,307
TURBOFAN JET ENGINE TOOL
Filed Jan. 26, 1966 3 Sheets-Sheet 1
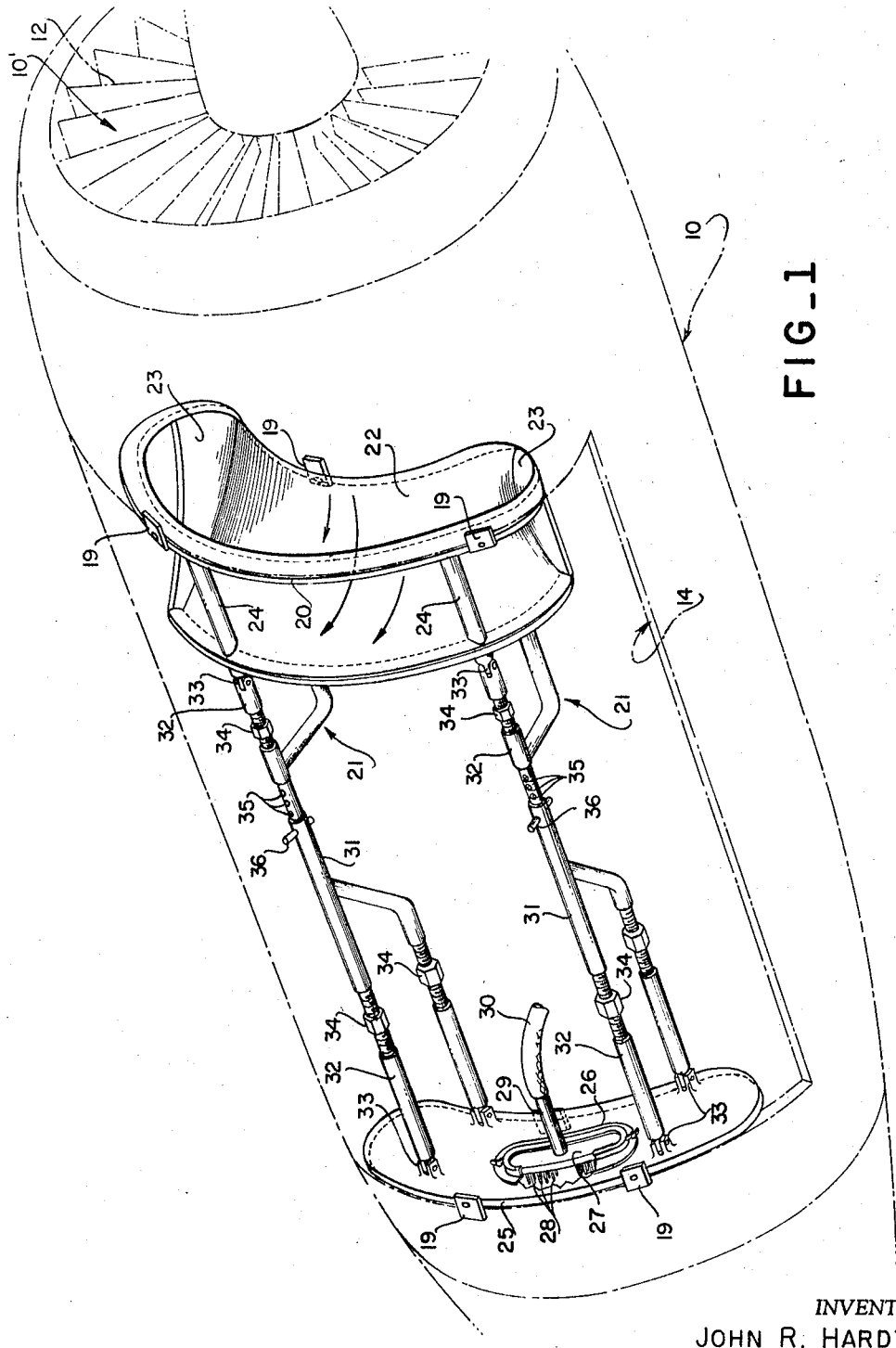
FIG_1
INVENTOR.
JOHN R. HARDY
BY
George C. Sullivan
Agent June 6, 1967 J. R. HARDY 3,323,307
TURBOFAN JET ENGINE TOOL
Filed Jan. 26, 1966 3 Sheets-Sheet 2
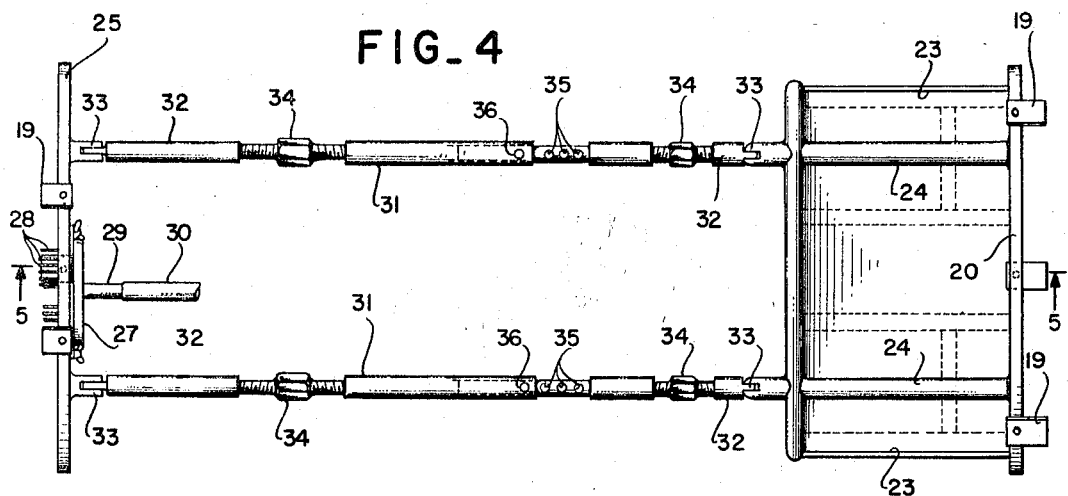
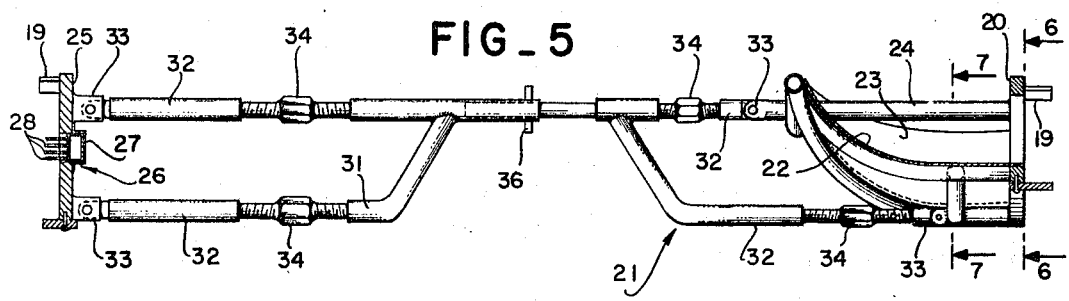
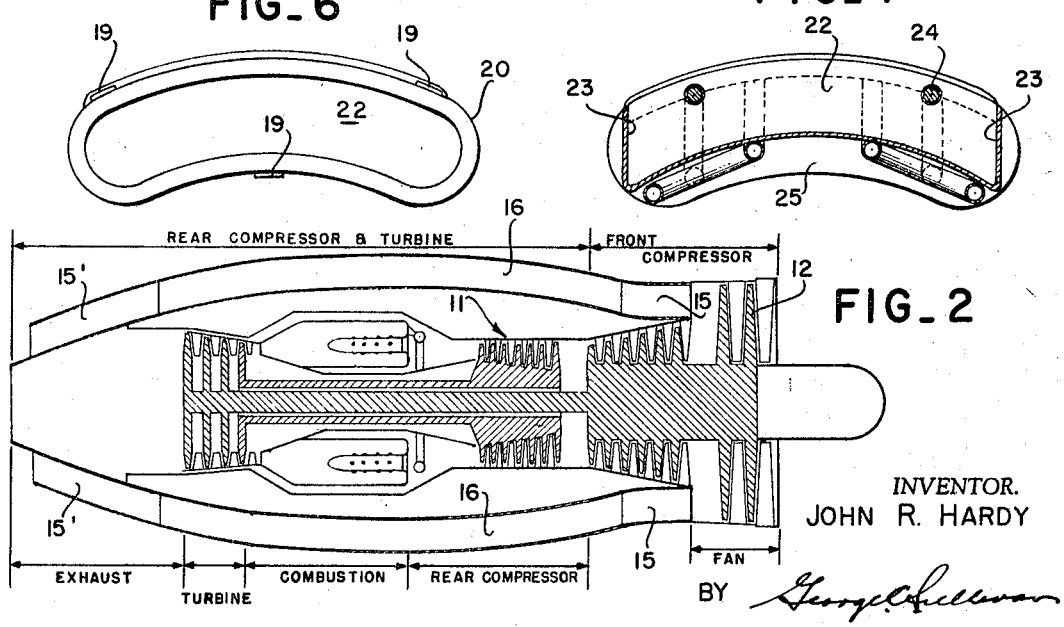
INVENTOR.
JOHN R. HARDY
BY George C. Sullivan
Agent June 6, 1967 J. R. HARDY 3,323,307
TURBOFAN JET ENGINE TOOL
Filed Jan. 26, 1966 3 Sheets-Sheet 3
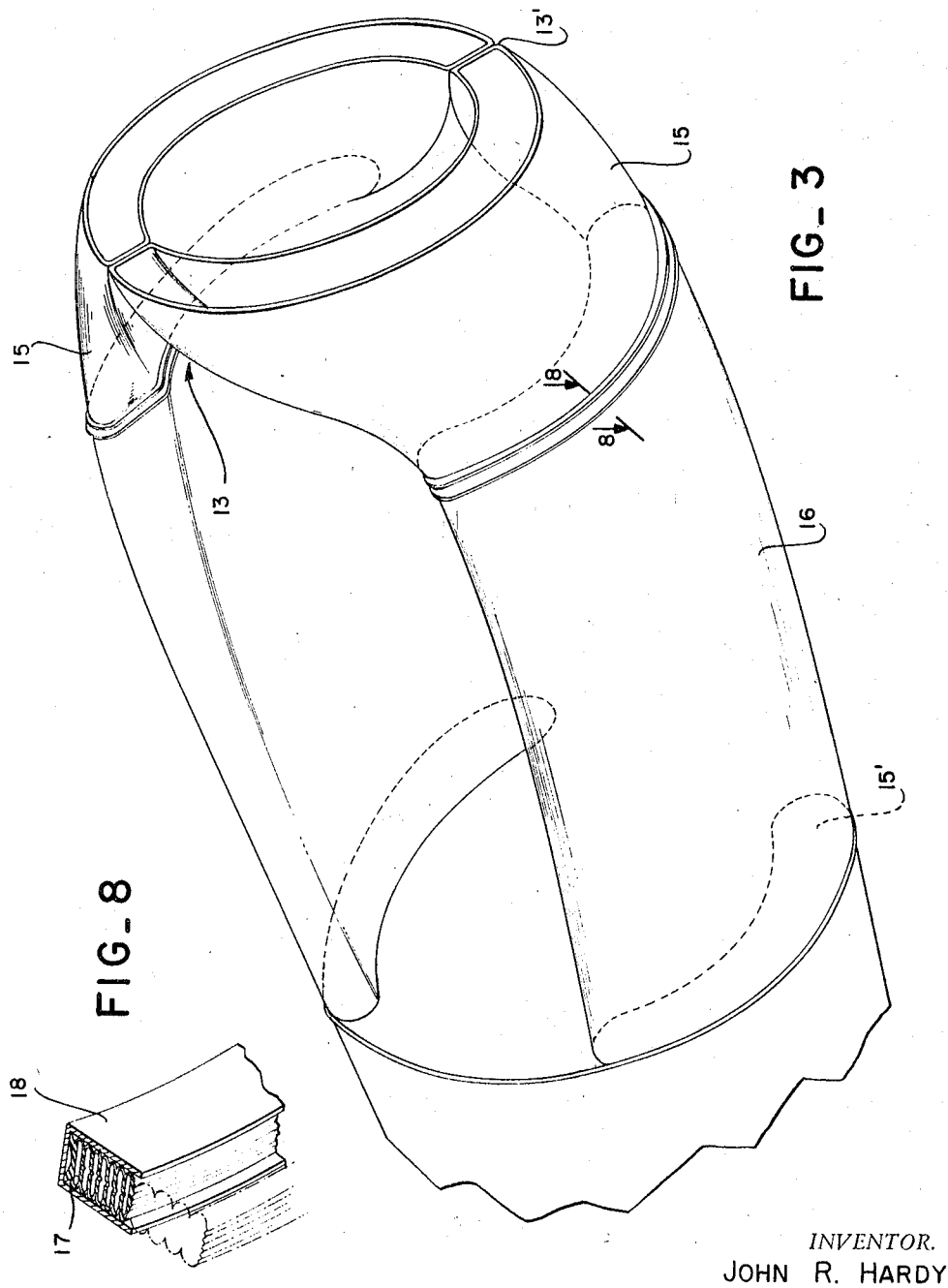
FIG_3
FIG_8
INVENTOR.
JOHN R. HARDY
BY
George Sullivan
Agent

United States Patent Office 3,323,307
Patented June 6, 1967

3,323,307
TURBOFAN JET ENGINE TOOL
John R. Hardy, Marietta, Ga., assignor to Lockheed Aircraft Corporation, Burbank, Calif.
Filed Jan. 26, 1966, Ser. No. 523,178
6 Claims. (Cl. 60—226)

This invention relates to tools employed in the maintenance and service of jet engines and more particularly to such a tool that is adapted to temporarily replace the closure for an access opening in the housing of a turbofan jet engine that normally coacts with parts of the engine for its proper and efficient operation to the end that such engine may be operated for the purpose of testing, servicing and repairing it with the closure removed.

Turbofan jet engines mounted externally of aircraft in aerodynamic housings or nacelles incorporate bypass ducts aft of their inlet and fan to extract predetermined portions of air that is to be fed into the compressor and combustors for the purpose of minimizing drag. This extracted air is either ejected immediately from the engine through a "short duct" fan exhaust system or at the aft end of the engine through a "long duct" fan exhaust system where it is mixed and ejected with hot exhaust gases. In either case an opening or openings are provided in and along the side of the nacelle to permit access to the engine and its parts for the servicing and maintenance thereof with a removable door to close each such opening during normal operation of the aircraft.

In order to minimize the nacelle size and to preserve its aerodynamic configuration, the associated bypass duct is often extended through the access door or a part thereof and pressure seals are employed at and along the edges of the duct openings to prevent leakage therethrough when the door or closure is secured. This complicates service operations, however, where it is necessary to operate the engine with the door open or removed since the blast of air through the opening excludes workmen or mechanics from the area.

Moreover, with the closure removed from the access opening the clamping force it normally applies against the pressure seal to contain it in its operative position is no longer there and the seal which is inflated by air from the engine is eventually ruptured. Also, the jet nozzles carried by the closure and normally diverting some of the bypass air to critical parts of the engine to prevent them from overheating having been removed, the engine and its operation at this time can be impaired.

The present invention is therefore directed to a tool adapted to be readily installed within the access opening while the closure or door is open or removed and which in position performs substantially as does the door when installed and closed. At the same time this tool permits unrestricted access to the engine and its several parts. The tool is adjustable in length to facilitate its installation in and removal from access openings as well as to correspond to closures for such openings within a range of lengths.

More specifically, the tool herein proposed comprises an adjustable frame having opposite ends that abut the sidewalls of the nacelle defining the access opening and includes releasable connectors to engage such walls and immovably secure it thereto to form in effect an integral part of the nacelle. The forward end of the frame conforms to the associated bypass duct and includes a wall extending rearwardly and outwardly to define an extension of the bypass duct that discharges laterally of the engine. The air from the fan entering the bypass duct is thereby deflected away from the engine so that work can be accomplished on the engine aft of the deflecting wall or baffle of the tool.

The aft end of the frame conforms to the associated bypass duct and includes an air-jet nozzle means adapted to connect a convenient source of air pressure. Thus, coolant air can be made available to localized parts of the engine, e.g., the oil coolers to prevent them and their oil from overheating during run-up and other test operations of the engine.

With the opposite ends of the tool abutting the adjacent sides of the access opening as stated, the pressure seals associated with these sides are thereby clampingly engaged similarly to the engagement by the closure when secured. This prevents bleed air from the engine when operating from over-inflating the seals as would otherwise occur.

With the above and other objects in view as will be apparent this invention consists in the construction, combination and arrangement of parts all as hereinafter more fully described, claimed and illustrated in the accompanying drawings wherein:

FIGURE 1 is an isometric view of a tool designed and constructed in accordance with the teachings hereof and a general outline in phantom of a typical housing or nacelle adapted to contain a turbofan jet engine to show the relative position of the tool when operatively installed therein in place of the access door which has been removed, only the pertinent part of the nacelle being shown together with the fan of the engine housed therein;

FIGURE 2 is a longitudinal schematic of the turbofan jet engine adapted to be housed within the nacelle of FIGURE 1 to show the engine core and bypass duct arrangement as well as the middle section of each bypass duct that is carried by and removable with the access door when opened;

FIGURE 3 is an isometric view of the bypass ducts alone with the aft portion thereof broken away;

FIGURE 4 is a side elevation of the tool alone;

FIGURE 5 is a longitudinal section taken along line 5—5 of FIGURE 4;

FIGURE 6 is an end view of the tool taken along line 6—6 of FIGURE 5;

FIGURE 7 is a transverse section taken along line 7—7 of FIGURE 5; and

FIGURE 8 is a section taken along line 8—8 of FIGURE 3 to show the inflatable pressure seal associated with each end of the bypass duct adjacent each access door, the position of the seal when inflated and unrestrained being shown in phantom.

Referring with greater particularity to the drawings, 10 designates a typical nacelle employed to house a conventional turbo-fan jet engine 11. As illustrated generally in FIGURE 2, the engine 11 essentially comprises a front compressor section and a rear compressor and turbine section. The forward portion of the front compressor constitutes a fan having a transverse dimension greater than the core of the engine which includes the rear compressors, combustors, turbines and exhaust assembly. Disposed at the aft end of the fan and around the rear portion of the front compressor is a bifurcated duct 13 having an annular inlet 13'. Thus, a predetermined part of the fan air passes into the core of the engine 11 for the operation thereof while the remainder bypasses the core of the engine 11 flowing through the duct 13.

In order to service, repair, maintain, etc., the engine 11 within the nacelle 10, an access opening 14 (FIGURE 1) is provided in each side of the nacelle 10 and a removable door (not shown) having external and internal surfaces that conform to the adjacent structure of the engine 11 and nacelle 10 fills and closes each opening 14. Each branch 15 of the bifurcated duct 13 conforms transversely to and communicates with a duct 16 passing through the associated door between its exterior and interior surfaces.

For purposes of illustrating and describing the present tool, each duct 16 is considered to pass the entire length of the access door. Thus, the branch 15 of the bifurcated duct 13 on each side of the engine 11 terminates in an opening adjacent the edges of the access opening 14, and the duct 16 within the associated door when installed and closed serves to interconnect the branch duct 15 on that side of the nacelle with its aft extension 15' and form an uninterrupted continuation thereof.

Air leakage at the juncture of each branch duct 15 and its aft extension 15' with the adjacent ends of the associated door duct 16 is prevented by an inflatable seal 17 disposed around the open ends of the branch duct 15 and its extension 15'. To this end a retaining channel 18 is secured in place by appropriate connection to the defining edges of the respective ducts 15 and 15' each opening outwardly and toward the other to permit the seal 17 to project therefrom when inflated in the customary manner from bleed air under pressure from the engine 11 through appropriate lines (not shown). When the door is closed and the duct 16 is in alignment with the ducts 15 and 15', the seal 17 thus inflated is forced into abutment against the adjacent edge of the duct 16.

When the door is opened or removed, as for example in order to service the engine 11, the absence of that portion of the duct 16 carried by the door makes the operation of the engine 11 dangerous not only in that the fan air is discharged through the opening in the branch duct 15 onto and against the exposed parts of the engine 11 but also such air strikes workmen in the area. Thus, service and maintenance men do not have free access to the engine at this time.

Moreover, with the door opened or removed and the edges of the duct 16 out of abutment against the associated seals 17, inflation of the seals 17 is unchecked. The seals 17 thus expand beyond their elastic limit to a point of permanent deformation and in the extreme case to the bursting point.

The tool herein proposed to remedy the above conditions is connectable across the access opening 14 in axial alignment with the duct sections 15 and 15' by means of releasable clamps 19 whereby it is immovably secured in position to the nacelle 10 at its opposite ends. The clamps 19 thus serve to properly align the tool with the openings in the duct sections 15 and 15' and to maintain it against relative lateral movement. At its forward end the tool is defined by a rigid band 20 conforming in size and shape to the opening of the branch duct 15 with which it is adapted to form an uninterrupted continuation when disposed in flush abutment against the inflatable seal 17 carried thereby. Thus positioned, it coacts with and contains the seal 17 in the same manner as does the access door when operatively installed and closing the opening 14.

To the rear face of the band 20 is secured in any conventional manner a rigid truss frame 21 preferably constructed of tubular metal defining a plane curving from one longitudinal side of the band 20 in the direction and aft of the other longitudinal side. When this plane is covered with sheet material, such as for example reinforced Fiberglas or the like, an arcuate surface 22 is created. By disposing the sheet material at an angle to the surface 22 at the transverse sides of the frame 21 as at 23, a scoop is created which when the tool is installed as above described forms an extension of the branch duct 15. This scoop 22-23 thereby constitutes a deflector or baffle directing fan air laterally and outwardly of the engine 11. Structural integrity of this scoop 22-23 is increased by the addition of rigid struts 24 connected between the frame 21 and the longitudinal side of the band 20 in spaced relation thereto.

At its aft end the tool is defined by a cover plate 25 conforming in shape to and at least as large as the associated opening in duct 15' which it is adapted to overlie when disposed in flush abutment against the inflated seal 17 lining such opening. Thus disposed, the plate 25 coacts with and contains the seal 17 in the same manner as does the access door when operatively installed and closing the opening 14.

Medially the plate 25 is slotted or otherwise perforated as at 26 to receive and mount a manifold 27 having outlets 28 appropriately located therein to direct cooling air to parts of the engine that normally rely on the fan air passing through the bypass duct. The manifold 27 includes a fitting 29 adapted to receive a conventional hose 30 from a suitable source of air pressure.

The frame 21 and the plate 25 are interconnected one to the other through adjustable braces 31 whereby the overall length of the tool is established within predetermined limits. To this end each brace 31 comprises a rigid tubular member 32 adapted to telescope one within the other at their adjacent ends and each pivotally connected as at 33 to the frame 21 and plate 25 at their remote ends. Preferably, each member 32 is forked to provide a double hinge connection 33 with the frame 21 and plate 25 with each such connection located adjacent the opposite marginal edge of its associated frame 21 or plate 25.

In its length each member 32 is provided with a screw or turnbuckle 34 adjacent each hinge 33 to permit minor adjustments of the overall length of the tool as well as the relative angularity of the outer faces of the associated band 20 and plate 25. The major length adjustments of the tool are accomplished at its telescoped or overlapped ends where each of the members 32 is provided with a series of perforations 35 whereby a selected alignment of perforations 35 in each end of the members 32 permits a pin 36 to be inserted therein to maintain the connection of the tool ends at the selected length.

In view of the foregoing construction and arrangement, the tool is readily installed in position in the access opening 14 in place of the closure therefor and tension applied by adjustment of the turnbuckles 34 and pins 36. Clamps 19 are then tightened to ensure the immovable position of the tool in the opening 14.

With the tool thus installed, normal operation of the engine results in the deflection of fan air extracted by and passing through the bypass duct 13 by the baffle or scoop 22-23 laterally from the nacelle 10. The parts of the engine 11 disposed aft of the scoop 22-23 are thereby protected against such air blast and this area of the engine is accessible to workmen for inspection, checking, servicing, repairing, etc.

At the same time inflation of the seals 17 at opposite ends of the opening 14 by air from the engine 11 during its operation is controlled by the band 20 and plate 25 in the manner similar to that of the door containing duct section 16 when closing the opening 14. Thus, the outer face of each seal 17 abuts the adjacent surface of the band 20 or plate 25 which coacts with the channel 18 to completely contain the seal 17 and thereby prevent its over-inflation.

Also, any source of air pressure is connectable to the manifold 27 through the hose 30 while the engine 11 is running to simulate the flow of fan air through the aft duct 15' in normal operation with duct 16 in place. This air flow is directed by the several nozzles 28 of the manifold 27 at engine parts to be cooled.

While a particular embodiment of the invention has been hereinabove illustrated and described, it will be obvious to those skilled in the art that various changes and modifications may be made without departing from the invention. It is intended to cover in the appended claims all such modifications and equivalents as fall within the true spirit and scope of this invention.

What is claimed is:

1. A tool adapted to temporarily replace the closure for an access opening in the housing of a turbofan jet engine incorporating a bypass duct to receive portions of air from the fan of the engine and conduct it away from the core of the engine, a part of said bypass duct being defined by said closure, comprising a frame having opposite ends engageable with said housing defining said access opening and substantially conforming in size and shape to the transverse dimensions of said bypass duct, and a baffle adjacent the forward end of said frame defining an extension of said bypass duct laterally and outwardly of said engine.

2. The tool of claim 1 wherein a seal is associated with said bypass duct adjacent said closure and said frame includes means to clampingly engage said seal.

3. The tool of claim 1 including nozzle means associated with the aft end of said frame adapted to connect a source of air pressure.

4. The tool of claim 1 including lineal adjustment means in the length of said frame whereby said opposite ends are forcibly held against the edge of said housing defining said access opening, and a plurality of clamps carried by each said end to releasably engage said housing.

5. The combination with a turbofan jet engine mounted within a housing incorporating a bypass duct to receive portions of air from the fan of the engine and conduct it around the core of the engine and having an access opening interrupting said bypass duct medially of its length, a removable closure filling said access opening, a duct in said closure conforming in transverse shape and area to said bypass duct whereby to act as an extension thereof, and a seal defining each edge of the bypass duct associated with said closure duct to be operatively engaged thereby and prevent fluid leakage, of a tool to temporarily replace said closure when removed from said opening comprising a frame having opposite ends adapted to operatively engage each said seal as aforesaid, and a baffle adjacent the forward end of said frame forming a continuation of said bypass duct laterally and outwardly of said engine.

6. The combination with a turbofan jet engine mounted within a housing incorporating a bypass duct to receive portions of air from the fan of the engine and conduct it around the core of the engine, said duct being formed by multiple sections disposed end to end in axial alignment, an access opening in said housing, a removable closure filling said access opening, one of said duct sections being mounted in said closure, and an inflatable seal defining each end of said duct sections adjacent said one duct section to be clampingly engaged thereby, of a tool to temporarily replace said closure and said one duct section when removed from said opening comprising interconnected end elements conformig in transverse size and shape to corresponding ends of said one duct section adapted to clampingly engage each said seal, a baffle carried by one of said end elements adapted to coact with the adjacent duct section in the forward direction of the engine forming a continuation thereof and extending laterally and outwardly of the engine, and air-jet nozzle means carried by the other of said end elements adapted to connect a source of air pressure.

No references cited.

MARK NEWMAN, *Primary Examiner.*

D. HART, *Assistant Examiner.*